UNITED STATES PATENT OFFICE.

FRANÇOIS RAYNAUD, OF TESSENDERLOO, BELGIUM, ASSIGNOR TO THE COMPAGNIE GÉNÉRALE L'ALUMINE, EXPLOITATION DES BREVETS F. RAYNAUD, SOCIÉTÉ ANONYME, OF BRUSSELS, BELGIUM.

PROCESS OF MAKING ALKALINE ALUMINATES.

SPECIFICATION forming part of Letters Patent No. 612,364, dated October 11, 1898.

Application filed May 23, 1896. Serial No. 592,837. (No specimens.) Patented in Belgium December 24, 1895, No. 119,179.

*To all whom it may concern:*

Be it known that I, FRANÇOIS RAYNAUD, a French subject, residing at Tessenderloo, Belgium, have invented a new and useful Improved Process for the Treatment of Aluminous Ores and Silicious Matters, (for which I have obtained a patent in Belgium, dated December 24, 1895, No. 119,179,) of which the following is a specification.

This invention consists in a new or improved process for the treatment of aluminous ores with the object of obtaining alkaline aluminates free from silicates, sulfur, sulfureted hydrogen, and consequently pure alumina.

The said invention is based on the reaction which takes place at a comparatively low temperature when steam is caused to act on an aluminous ore in the presence of a sulfid the base of which is capable of combining with alumina. Thus I. When a mixture of bauxite and sulfid of sodium is brought to a dull-red heat in presence of steam, aluminate of soda is formed without difficulty and sulfureted hydrogen is liberated. This reaction is expressed as follows:

$$2Al_2O_3 + 3Na_2S + 3H_2O = Al_4O_9Na_6 + 3H_2S.$$

II. If under the same conditions a mixture of bauxite, sulfid of sodium, and sulfate of soda be calcined, sulfur in the form of vapor is set free instead of sulfureted hydrogen, and steam is re-formed. The following is the formula of this reaction:

$$8Al_2O_3 + 9Na_2S + 3Na_2SO_4 + H_2O = 4Al_4O_9Na_6 + H_2O + 12S.$$

The said reaction takes place as soon as the sulfid or sulfate is capable of yielding an aluminate.

The presence of the iron, which is contained in the bauxite in the form of ferric oxid, has no effect on the result of the operation. Therefore no reference is made to it in the foregoing formulæ.

The same reactions may serve also for extraction of the sulfur, and in this case the alkaline sulfids and sulfates may be replaced by more economical materials—such, for example, as sulfid of calcium.

The aluminous ore should always be proportioned to the quantity of the compound susceptible of combination.

III. In the commercial production of alkaline aluminates by the reaction I hereinbefore described the process may be rendered more economical by forming briquets of a mixture of aluminous ore, carbon, and alkaline sulfate, the sulfid of sodium being dispensed with. For example, where aluminate of soda is required to be obtained the said mixture should contain about nine hundred kilos of sulfate of soda, two hundred and seven kilos of carbon, and six hundred and forty kilos of alumina, and where aluminate of potash is to be obtained the sulfate of soda is replaced by sulfate of potash, due regard being had to the difference of the equivalents. The briquets are next rapidly dried upon cast-iron frames or plates heated to a bright-red heat, or any other means may be used whereby the drying may be effected with sufficient rapidity to produce a high degree of porosity. The briquets are then charged into cylinders or retorts, wherein they are heated to and maintained at a bright-red heat by external firing. These cylinders communicate with each other, and through each of them in succession a current of steam passes, the said steam traveling from one to another of the said cylinders in regular order and passing through the briquets, the passage of the steam through the briquets being permitted by their porosity. The gases which escape through the outlet of the last cylinder consist of sulfureted hydrogen ($H_2S$) and carbonic oxid, (CO.) As the carbonic oxid cannot in any way interfere with reuse of the sulfur contained in the surfureted hydrogen it is available for reuse in known ways. The blocks thus treated yield on being subsequently lixiviated a very clear solution of alkaline aluminate.

The economical production of the aluminates being effected by the means hereinbefore indicated (reactions I, II, and III) to obtain pure alumina and alkaline carbonate, the clarified lixivium of aluminate is subjected to the action of a current of carbonic acid according to the known process.

I claim—

1. The process for the production of alkaline aluminates free from silicates and the simultaneous production of sulfureted hydrogen consisting of heating aluminous ore mixed with any sulfid the base of which is capable of combining with alumina and causing a current of steam to pass through the heated mixture substantially as hereinbefore described.

2. The process for the production of alkaline aluminates free from silicates and the simultaneous production of sulfureted hydrogen consisting of heating aluminous ore to which is added a mixture of sulfid and sulfate the base of which is capable of combining with alumina and causing a current of steam to pass through the heated mixture substantially as hereinbefore described.

3. The process for the production of alkaline aluminates free from silicates and the simultaneous production of sulfureted hydrogen consisting of heating a mixture of aluminous ore, carbon and alkaline sulfate in the form of briquets which have been rapidly dried to produce a high degree of porosity, and causing a current of steam to pass through the said heated briquets substantially as and for the purpose described.

FRANÇOIS RAYNAUD.

Witnesses:
H. T. E. KIRKPATRICK,
GREGORY PHELAN.